(12) United States Patent
Schneider

(10) Patent No.: US 11,396,268 B1
(45) Date of Patent: Jul. 26, 2022

(54) SEATBACK-MOUNTED REAR AIRBAG ASSEMBLIES

(71) Applicant: Autoliv ASP, Inc., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/154,860

(22) Filed: Jan. 21, 2021

(51) Int. Cl.
    *B60R 21/207*    (2006.01)
    *B60R 21/2338*    (2011.01)
    *B60R 21/231*    (2011.01)

(52) U.S. Cl.
    CPC ........ *B60R 21/207* (2013.01); *B60R 21/2338* (2013.01); *B60R 2021/2074* (2013.01); *B60R 2021/23153* (2013.01)

(58) Field of Classification Search
    CPC .............. B60R 21/207; B60R 21/2338; B60R 2021/2074; B60R 2021/23153
See application file for complete search history.

(56) References Cited

U.S. PATENT DOCUMENTS

| | | | |
|---|---|---|---|
| 9,296,353 B1 * | 3/2016 | Choi ................. | B60R 21/01554 |
| 2015/0091281 A1 * | 4/2015 | Nagasawa ............ | B60N 2/4221 280/730.1 |
| 2018/0186325 A1 * | 7/2018 | Jaradi .................... | B60R 21/207 |
| 2019/0047503 A1 * | 2/2019 | Faruque ............ | B60R 21/01554 |
| 2019/0077356 A1 | 3/2019 | Patel et al. | |
| 2021/0094503 A1 * | 4/2021 | Farooq ................ | B60R 21/2338 |

FOREIGN PATENT DOCUMENTS

| | | | | |
|---|---|---|---|---|
| DE | 4008243 A1 | * | 9/1991 | ........... B60R 21/207 |
| DE | 10201836 A1 | * | 8/2003 | ........... B60R 21/207 |
| DE | 102016008386 A1 | * | 1/2018 | ........... B60R 21/207 |
| EP | 0291554 A1 | * | 11/1988 | ....... B60R 21/01516 |
| EP | 3421301 A1 | * | 1/2019 | ........... B60R 21/231 |
| EP | 3640093 A1 | * | 4/2020 | |
| WO | WO-0021797 A1 | * | 4/2000 | ........... B60R 21/207 |
| WO | WO-2016/149022 A1 | | 9/2016 | |

OTHER PUBLICATIONS

Foreign Search Report on PCT PCT/US2022/070162 dated Mar. 23, 2022.

* cited by examiner

Primary Examiner — Drew J Brown
(74) Attorney, Agent, or Firm — Foley & Lardner LLP

(57) ABSTRACT

A seatback-mounted rear airbag assembly is disclosed wherein the airbag assembly is mounted forward of an occupant of a rearward vehicle seating position and disposed at least partially within a seatback of a vehicle seating position forward of the occupant. The airbag assembly is disposed partially within the seatback and partially within a headrest whereby a lower attachment and an upper attachment of an inflatable airbag cushion couple the inflatable airbag cushion at multiple points to properly disposed the inflatable airbag cushion forward of the occupant.

19 Claims, 9 Drawing Sheets

US 11,396,268 B1

SEATBACK-MOUNTED REAR AIRBAG ASSEMBLIES

TECHNICAL FIELD

The present disclosure relates generally to the field of automotive protection systems for vehicle occupants. More particularly, the present disclosure relates to airbag assemblies, such as inflatable rear airbag assemblies mounted to a seatback of a vehicle and configured to deploy in response to a collision event.

BACKGROUND

Inflatable airbag assemblies may be mounted within a vehicle and deploy during a collision event. The deployed airbag may cushion an occupant and prevent or mitigate detrimental occupant impact with vehicle structures. Some airbags may suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
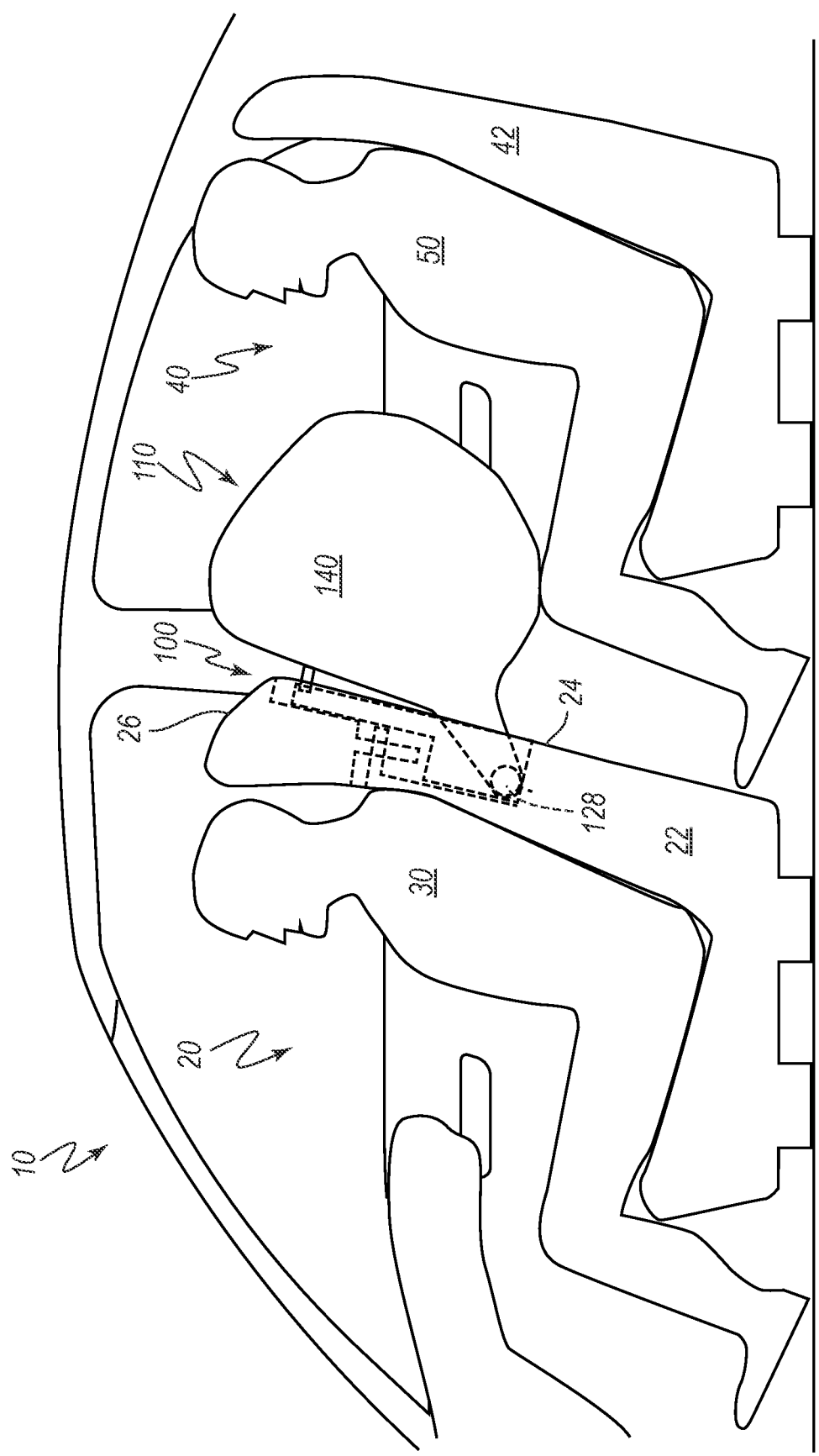
FIG. 1 is a side view of a portion of an interior of a vehicle equipped with a seatback-mounted rear airbag assembly ("SRAA") in a partially deployed configuration, according to one embodiment of the present disclosure.

Occupant protection systems, such as airbag assemblies, are widely used to prevent or reduce occupant injury during a collision event. Airbag modules may be installed at various locations within a vehicle, including, but not limited to, a steering wheel, a dashboard/instrument panel, within a side door or a side of a seat, in or at a seatback of a seat, adjacent to a roof rail, etc. In the following disclosure, "airbag" generally refers to an inflatable airbag, such as, for example, a passenger airbag that is typically housed in a vehicle structure forward of a vehicle seating position, although the principles discussed herein may apply to other types of airbags (e.g., airbags mounted above a vehicle seating position, door-mounted airbags, knee airbags). In the following disclosure, specific reference is made to airbag assemblies that are designed to deploy at a vehicle seating position that is rearward of another vehicle seating position.

During installation, the disclosed airbags are typically disposed at an interior of a housing in a packaged state (e.g., rolled, folded, and/or otherwise compressed) or a compact configuration and may be retained in the packaged state behind a cover. During a collision event, an inflator may be triggered, which rapidly fills the airbag cushion with inflation gas. The inflation gas may cause the airbag cushion to rapidly transition from a compact packaged (i.e., undeployed) state to an expanded or deployed state. For example, the expanding airbag may open an airbag cover (e.g., by tearing through a burst seam or opening a door-like structure) to exit the housing. The inflator may be triggered by any suitable device or system, and the triggering may be in response to and/or influenced by one or more vehicle sensors.

Some embodiments of airbag assemblies disclosed herein may be particularly well suited for cushioning an occupant seated rearward of a front seat of a vehicle, and may be mounted to a seatback forward of a vehicle seating position occupied by such an occupant. An airbag assembly can mitigate injury to an occupant of a vehicle during a collision event by reducing the effect of impact of the occupant against structures (body-structure impact) within the vehicle (such as a seatback of a seat forward of the occupant). While airbag assemblies are useful in mitigating such injuries, occupant impact on an airbag introduces a risk for other injuries. For example, during a collision event, an airbag for an occupant rearward of a front seat may be deployed coupled (or coupling) to the seatback forward of the occupant at a single point of contact, permitting the airbag to oscillate, rotate, or otherwise move relative to the seatback and relative to the occupant such that the airbag may be out of position to protectively receive the occupant at the moment the airbag receives the occupant. With an airbag out of position to properly receive the occupant, the airbag may fail to prevent or reduce body-structure impact with the seatback, or may cause the occupant to strike another component (e.g., a door post or window) that the occupant otherwise would not strike.

Some embodiments of the present disclosure can provide positioning, cushioning, and/or safety to an occupant of a vehicle in an occupant position rearward of another vehicle seating position.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The terms "connect" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrase "attached to" refers to interaction between two or more entities that are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" (and "rear" and "aft") are used with reference to the front and back of the relevant vehicle. For example, a forward door may be nearer the front of the vehicle than another door, and a rearward door may be nearer the back of the vehicle than another door.

The directional terms "proximal" and "distal" are used herein to refer to opposite locations on an airbag cushion or a component of an airbag assembly. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seatback from which an airbag deploys. Specifically, "proximal" is situated toward such point of attachment and "distal" is situated away from such point of attachment.

The term "vehicle seating position," as used herein, refers to a location within a cabin of a vehicle configured for or otherwise intended to be occupied by an occupant.

The term "seat," as used herein, refers to a structure within the cabin of a vehicle disposed at a vehicle seating position and installed such that an occupant may be seated thereon/therein for transport within the vehicle.

The term "front seat," as used herein, refers to any seat that is disposed immediately rearward of the instrument panel, regardless of whether disposed to either side of the vehicle, and which is disposed forward of any "back seat(s)" (defined below) which may be present in the vehicle.

The term "back seat," as used herein, refers to any seat that is disposed rearward of the front seat(s) of a vehicle, regardless of whether the seat is the most rearward seat in the vehicle. The term "back seat" also refers to any seat that is disposed rearward of other back seats.

The term "seatback," as used herein, refers to a portion of a seat and, generally, is disposed rearward of, coupled to, and rising upward from a rearward portion of a base of the seat. In an instance of a rearward facing seat, the seatback may be disposed forward relative to the vehicle.

The term "vehicle" may refer to any vehicle, such as a car, truck, utility vehicle, bus, airplane, etc.

The term "occupant" generally refers to a person within a vehicle. The term "occupant" can also include a crash test dummy within a vehicle.

FIG. 1 is a side view of a portion of an interior of a vehicle 10 equipped with a seatback-mounted rear airbag assembly ("SRAA") 100, according to one embodiment of the present disclosure. The vehicle 10 comprises a first vehicle seating position 20 and a second vehicle seating position 40. A seat 22 is disposed at the first vehicle seating position 20. The seat 22 comprises a seatback 24 and a headrest 26. The second vehicle seating position 40 is disposed rearward of the first vehicle seating position 20. The second vehicle seating position 40 comprises a seat 42. A first occupant 30 is shown seated at the first vehicle seating position 20. A second occupant 50 is shown seated at the second vehicle seating position 40. In the illustration of FIG. 1, the first vehicle seating position 20 is represented as a front seat of the vehicle 10; however, this is for convenience of the disclosure and not by way of limitation. More particularly, in some vehicles, e.g., a van, a sport-utility vehicle ("SUV"), a bus, a watercraft, an aircraft, a train car, multiple instances of the second vehicle seating position 40 may be present, potentially arranged singly or by rows aft of the first vehicle seating position 20.

The SRAA 100 comprises an inflatable airbag module 110. The inflatable airbag module 110 is mounted at least partially within a seatback 24 of the seat 22 in the first vehicle seating position 20. The inflatable airbag module 110 comprises an inflator 128 and an inflatable airbag cushion 140. While a tube-style inflator 128 is depicted, this is for convenience of the disclosure and not by way of limitation, and the disclosure anticipates that other inflator types may be employed in various embodiments. The inflatable airbag cushion 140 is shown in an at least partially deployed state for ease of reference. Furthermore, for convenience of the disclosure and not by way of limitation, no protective system for the first occupant 30 is depicted or further discussed herein.

Figure 2A:
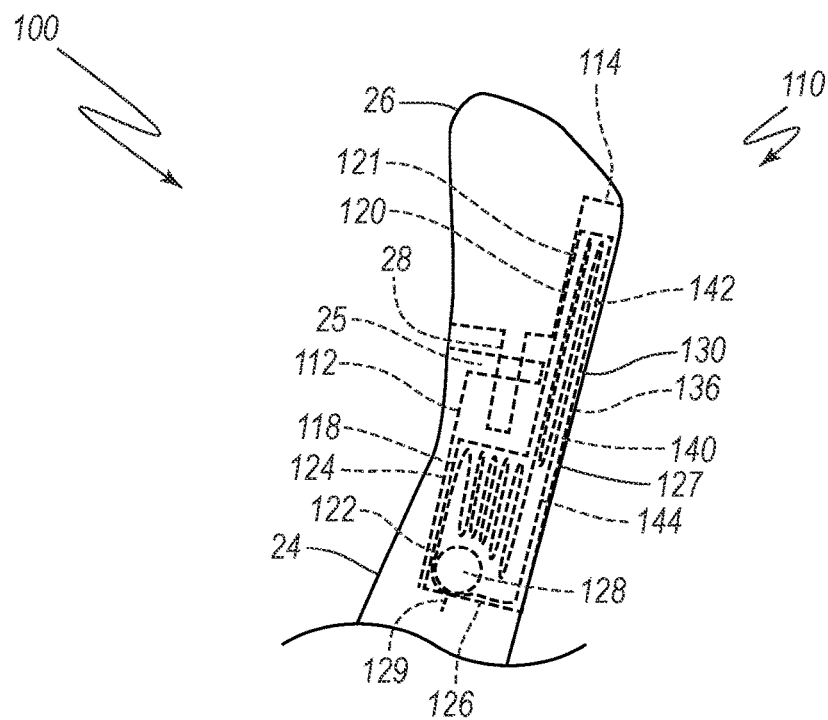
FIG. 2A is a detailed side view of a seat and a SRAA, according to one embodiment of the present disclosure.

FIG. 2A is a detailed side view of a portion of the seat 22 of the first vehicle seating position 20 and the SRAA 100, according to one embodiment of the present disclosure. The inflatable airbag module 110 comprises a housing 118 the inflatable airbag cushion 140. The housing 118 comprises a forward panel 124 and a lower panel 126. The housing 118 is disposed partially within the seatback 24. More particularly, the seatback 24 may be configured with a void, a recess, or a space 112 configured to accommodate at least a portion of the housing 118. In other words, the housing 118 may be at least partially within the seatback 24 of the seat 22 of the vehicle 10.

The inflator 128 is disposed at least partially within the housing 118, and is configured to supply inflation gas to the inflatable airbag cushion 140. The inflator 128 is disposed at a lower portion 122 of the housing 118. The inflator 128 may be fixed to the lower portion 122 of the housing 118. In the illustrated embodiment of FIG. 2A, the inflator 128 is mounted to a lower panel 126 of the housing 118 by one or more mounting studs 129. In some embodiments, the inflator 128 may be mounted to a forward panel 124 of the housing 118.

The housing 118 comprises the lower portion 122 and an upper portion 120. The upper portion 120 may be partially disposed within the seatback 24. In some embodiment, the upper portion 120 is partially disposed out of a top 25 of the seatback 24. The upper portion 120 of the housing 118 may extend upward into a recessed area 114 of the headrest 26. The upper portion 120 may be an extension 121 that extends upward out of the top 25 of the seatback 24 and into the recessed area 114 of the headrest 26 of the seat 22. The extension 121 may be a protruding portion that protrudes out of the top 25 of the seatback 24. The headrest 26 may structurally couple to the seatback 24 at or through the top 25 of the seatback 24 of the seat 22 by means of support members 28. The headrest 26 may be an adjustable headrest in which the user may adjust the height of the headrest by sliding and locking the support members 28 to a different position. In some embodiments, the headrest 26 may be integral with the seatback 24 and the entire housing 118 may be disposed within the seatback 24.

The inflatable airbag cushion 140 may be disposed within the housing 118 in a compact, compressed, and undeployed configuration. The inflatable airbag cushion 140 may be configured to receive inflation gas from the inflator 128. The compact, compressed, and undeployed configuration of the inflatable airbag cushion 140 may comprise folding, rolling, pleating, or otherwise disposing the inflatable airbag cushion 140 compactly within the housing 118. The inflatable airbag cushion 140 comprises an upper portion 142 and a lower portion 144. The upper portion 142 of the inflatable airbag cushion 140, while in the compact, compressed, and undeployed configuration, may be disposed at least partially within the upper portion 120 (and/or the extension 121) of the housing 118. Likewise, the lower portion 144 of the inflatable airbag cushion 140 may disposed at least partially within the lower portion 122 of the housing 118 while in the compact, compressed, and undeployed configuration. The inflatable airbag cushion 140 may be disposed in a compact, compressed, undeployed configuration within the housing 118 and configured to receive inflation gas from the inflator 128 to deploy from the housing 118 to a deployed configuration.

The seatback 24 and the headrest 26 may be configured with a cover 130. The cover 130 may be disposed so as to cover a rear aspect of the inflatable airbag module 110. The cover 130 may be configured with a burst seam (or a split seam, a split line, or a tear seam) 136. The burst seam 136 may be configured to rupture, burst, or otherwise create a separation in the cover 130 whereby the inflatable airbag cushion 140 is able to exit the housing 118 and achieve a deployed configuration. Stated otherwise, a rear-facing portion of the housing 118 may be open and the SRAA 100 may be disposed with a cover 130 with a split line (e.g., a split seam, a burst seam, a tear seam) that is configured to break apart upon deployment of the inflatable airbag cushion 140.

In some embodiments, the SRAA 100 does not include a cover 130 to cover the seatback 24 and the headrest 26. The upper portion 120 of the housing 118 may be exposed. The seatback 24 may comprise a burst seam that allows the inflatable airbag cushion 140 to exit the housing 118 and achieve the deployed configuration. The housing 118 may also comprise a burst seam that extends up a rear panel 127 of the housing 118 and extends up into the extension 121 and opens and allows the inflatable airbag cushion 140 to exit the housing 118 and achieve the deployed configuration.

Figure 2B:
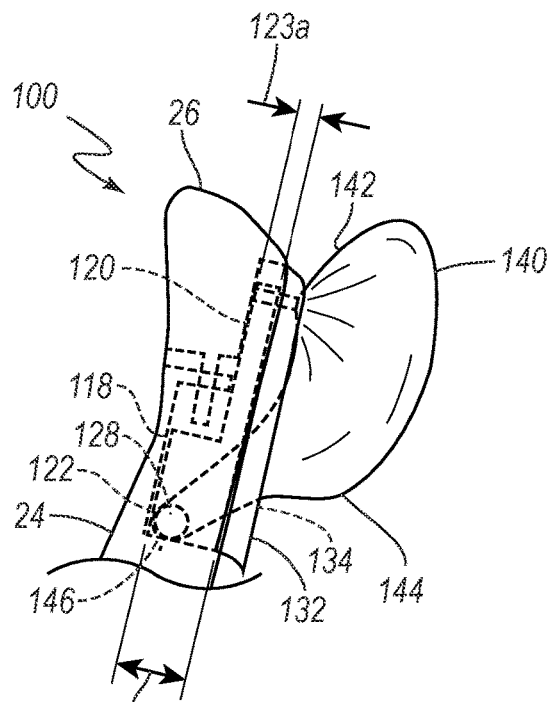
FIG. 2B is a detailed side view of the seat and the SRAA of FIG. 2A, with an inflatable airbag cushion at least partially deployed.

FIG. 2B is a detailed side view of a portion of the seat 22 of the first vehicle seating position 20 and the SRAA 100 of FIG. 2A, with the inflatable airbag cushion 140 partially deployed. The inflatable airbag cushion 140 comprises a lower attachment 146. The lower attachment 146 may be configured to couple at the inflator 128, at the lower portion 122 of the housing 118, or both. In other words, the lower attachment 146 of the inflatable airbag cushion 140 is attached to the inflator 128 and, by means of the mounting studs 129 of the inflator 128, is effectively anchored at the lower portion 122 of the housing 118. In one embodiment, the lower attachment 146 of the inflatable airbag cushion 140 may be coupled at the lower portion 122 of the housing 118. Furthermore, in one embodiment, the lower attachment 146 may be configured to direct inflation gas from the inflator 128 into the inflatable airbag cushion 140.

As shown in FIG. 2B, during deployment of the inflatable airbag cushion 140, the upper portion 142 of the inflatable airbag cushion 140 may remain disposed generally upward, or distal to the inflator 128 and proximal to the upper portion 120 of the housing 118. Similarly, the lower portion 144 of the inflatable airbag cushion 140 may remain disposed generally downward, or proximal to the inflator 128 and to the lower portion 122 of the housing 118. The upper portion 120 of the housing 118 may have a depth 123a within the seatback 24 and the headrest 26 that is less than the depth 123b of the lower portion 122 of the housing 118. In other words, the upper portion 120 of the housing 118 may have a reduced depth 123a compared to the depth 123b of the lower portion 122 of the housing 118.

In response to a collision event, the inflator 128 may be initiated whereby inflation gas is directed into the inflatable airbag cushion 140. The inflation gas may cause the inflatable airbag cushion 140 to expand. Expansion of the inflatable airbag cushion 140 may cause the burst seam 136 to separate. Separation of the burst seam 136 may dispose the cover 130 into a left portion 132 and a right portion 134 whereby the cover 130 opens to permit the expanding inflatable airbag cushion 140 to deploy from the housing 118.

Figure 2C:
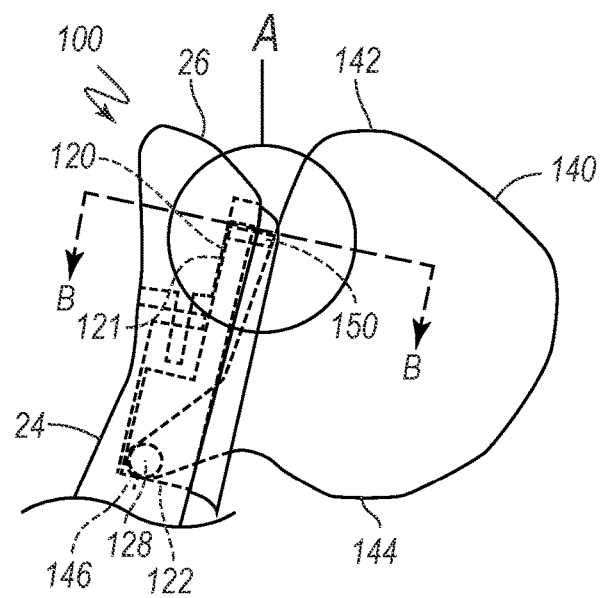
FIG. 2C is a detailed side view of the seat and the SRAA of FIG. 2A, with an inflatable airbag cushion at least partially deployed.

FIG. 2C is a detailed side view of a portion of the seat 22 of the first vehicle seating position 20 and the SRAA 100 of FIG. 2A, with the inflatable airbag cushion 140 at least partially deployed. The inflatable airbag cushion 140 in FIG. 2C is more inflated than the inflatable airbag cushion 140 in FIG. 2B. The seatback 24, the headrest 26, as well as the upper and lower portions 142, 144, respectively, of the inflatable airbag cushion 140 are identified for reference.

The lower attachment 146 of the inflatable airbag cushion 140 couples at a lower portion 122 of the housing 118. The inflatable airbag module 110 further comprises an upper attachment 150 that couples the upper portion 142 of the inflatable airbag cushion 140 to the upper portion 120 of the housing 118, or an upper portion of the extension 121 of the housing 118. Stated otherwise, the inflatable airbag cushion 140 comprises a lower attachment 146 that couples to a lower portion 122 of the housing 118 and an upper attachment 150 that couples to an upper portion 120 (or to an upper portion of an extension 121) of the housing 118. The upper attachment 150 couples to the upper portion 120 that extends upward out of the top 25 of the seatback 24.

Figure 4A:
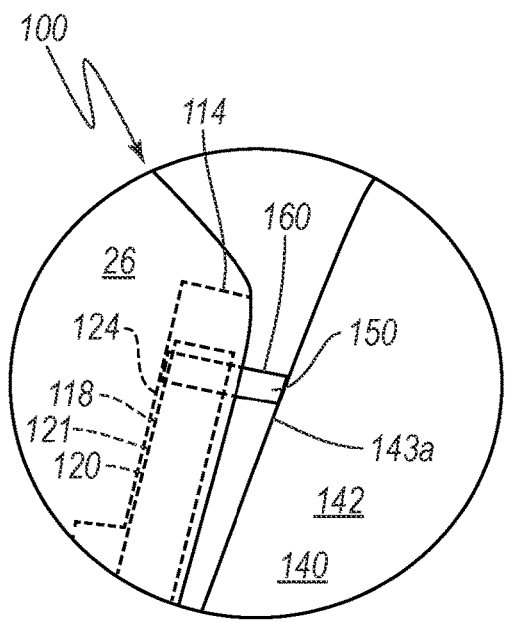
FIG. 4A is a detailed side view of a portion of a SRAA with an inflatable airbag cushion in a deployed configuration, according to one embodiment of the present disclosure.
Figure 4B:
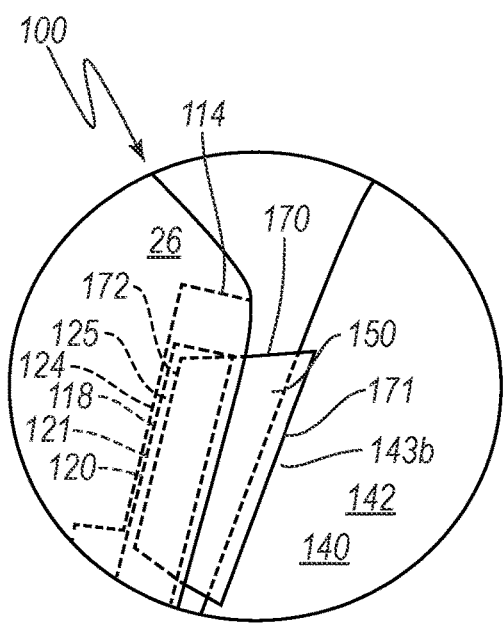
FIG. 4B is a detailed side view of the portion of the SRAA of FIG. 4A with an inflatable airbag cushion in a deployed configuration.
Figure 4C:
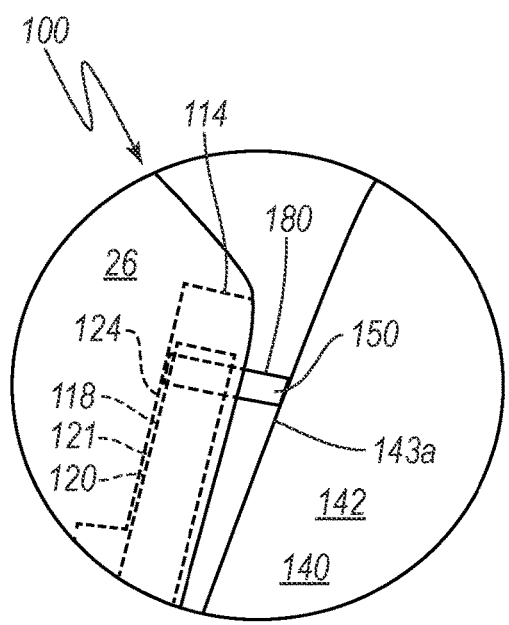
FIG. 4C is a detailed side view of the portion of the SRAA of FIG. 4A with an inflatable airbag cushion in a deployed configuration.

The callout A identifies a region more particularly described in conjunction with FIGS. 4A-4C. Similarly, the section line B indicates the view angle of FIGS. 9A-9C.

Figure 3A:
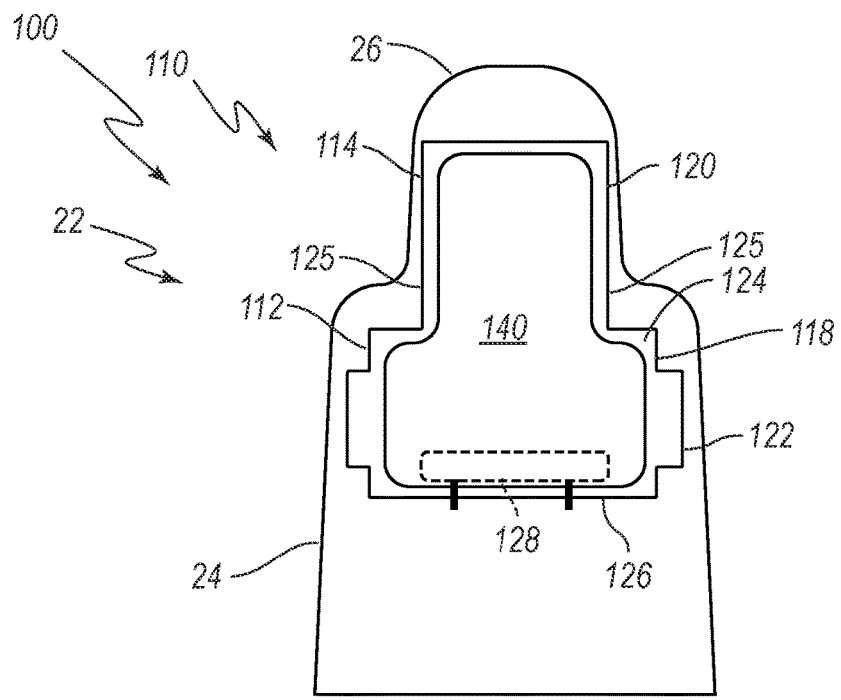
FIG. 3A is a rear view of a seatback of a seat and a SRAA in an undeployed configuration, according to one embodiment of the present disclosure.

FIG. 3A is a rear view of the seatback 24 of the seat 22 of the SRAA 100 in an undeployed configuration. For convenience of the disclosure, the cover (see the cover 130 in FIG. 2A) is omitted. The housing 118 of the inflatable airbag module 110 is shown at least partially disposed within the seatback 24 and the headrest 26. The seatback 24 may be configured with a void (or recess or space) 112 to accommodate the lower portion 122 of the housing 118. Likewise, the headrest 26 may comprise a void (or recessed area) 114 to accommodate the upper portion 120 (or extension 121) of the housing 118. The forward panel 124 and the lower panel 126 of the housing 118 are identified for reference. The housing 118 may be further configured with a side panel 125 to either or both lateral sides of the housing 118. The side panel(s) 125 extend(s) at least along a lateral aspect of the upper portion 120 of the housing 118. The inflatable airbag cushion 140 is disposed within the housing 118 in a compact, compressed, undeployed configuration. The inflator 128 is shown within the inflatable airbag cushion 140 and coupled to the lower panel 126.

Figure 3B:
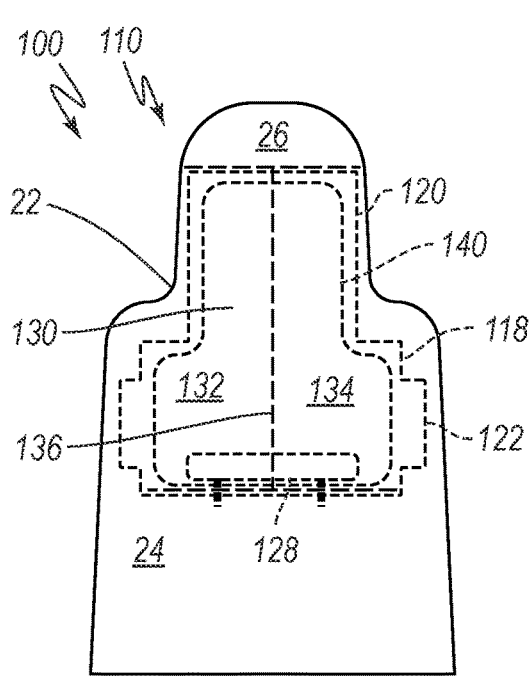
FIG. 3B is a rear view of the seatback of the seat and the SRAA of FIG. 3A in an undeployed configuration with a cover covering the SRAA.

FIG. 3B is a rear view of the seatback 24 of the seat 22 of the SRAA 100 of FIG. 3A in an undeployed configuration. The inflatable airbag module 110 is shown at least partially disposed within the seatback 24 and the headrest 26. The housing 118, as well as the upper portion 120 and lower portion 122 of the housing 118, and the inflator 128 are shown for reference. The inflatable airbag cushion 140 is disposed in a compact, compressed, undeployed configuration within the housing 118. The cover 130 is disposed to cover an open rear-facing portion of the housing 118. The cover 130 may be contiguous and formed of a suitable material, and may be contiguous, or generally contiguous, with a material covering the seatback 24 and headrest 26. In some embodiments, the cover 130 covers the seatback 24 but does not cover the headrest 26. In some embodiments, a portion of the extension 121 may extend out of the cover 130 and extend into the recessed area 114.

As discussed above, the cover 130 comprises the burst seam 136. The burst seam 136 may be a split seam, split line, tear seam, or other component designed to fail when the inflatable airbag cushion 140 begins to expand as a result of receiving inflation gas from the inflator 128. The cover 130 may comprise a left portion 132 and a right portion 134 disposed, respectively, to the left or to the right of the burst seam 136. The burst seam 136 may be configured to purposely fail during deployment of the inflatable airbag cushion 140, whereby the cover 130 may open to permit the inflatable airbag cushion 140 to deploy. In FIG. 3B, the split line of the burst seam 136 is shown having a general capital I-shape with an upper seam and a lower seam; however, this is for convenience of the disclosure and not by way of limitation. The disclosure anticipates that other configurations of the burst seam 136 may be employed.

Figure 3C:
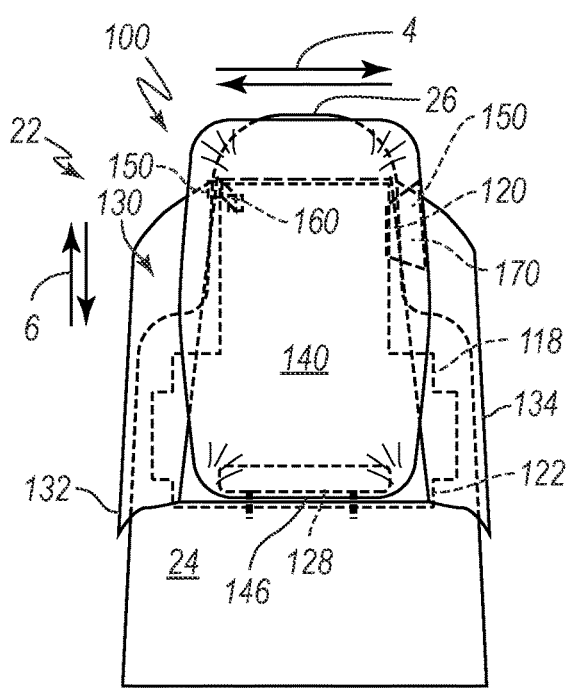
FIG. 3C is a rear view of the seatback of the seat and the SRAA of FIG. 3A in a deployed configuration.

FIG. 3C is a rear view of the seatback 24 of the seat 22 of the SRAA 100 of FIG. 3B in a deployed configuration. The seatback 24 and the headrest 26 of the seat 22 are identified for reference. In the illustration of FIG. 3C, the inflator 128 has been initiated as a result of a collision event, causing inflation gas to enter the inflatable airbag cushion 140 and resulting in the inflatable airbag cushion 140 opening the cover 130 along the burst seam 136 to deploy from the housing 118. The inflatable airbag cushion 140 is shown in an at least partially deployed configuration. The left portion 132 and right portion 134 of the cover 130 are disposed to the left and right, respectively, as a result of the cover 130 being split open.

The lower attachment 146 of the inflatable airbag cushion 140 couples at the lower portion 122 of the housing 118. The inflatable airbag cushion 140 further comprises an upper attachment 150. As described in further detail in conjunction with FIGS. 4A-4C, the upper attachment 150 couples between the inflatable airbag cushion 140 and the upper portion 120 of the housing 118. In FIG. 3C, two upper attachments 150 are depicted. In some embodiments, there may be more than two upper attachments 150. In some embodiments, there may be exactly one upper attachment 150.

In some embodiments, the upper attachment 150 may take the form of a tether 160, which is further described hereafter (see FIGS. 4A, 5A-5C, and 6A-6C). In some embodiments, the upper attachment 150 may take the form of a panel 170, which is further described hereafter (see FIG. 4B). In some embodiments, the upper attachment 150 may take the form of a loop 180, which is further described hereafter (see FIGS. 4C and 7A-8B). While FIG. 3C depicts the upper attachments 150 as one of a tether 160 and one of a panel 170, this is for convenience of the disclosure and not by way of limitation. In some embodiments, each upper attachment 150 may be tethers 160. In some embodiments, each upper attachment 150 may be panels 170. In some embodiments, each upper attachment 150 may be loops 180. In some embodiments, the upper attachments 150 may combine one or more of any of the tether 160, the panel 170, and the loop 180.

The upper attachments 150 and the lower attachment 146 of the inflatable airbag cushion 140 may be configured to, in combination, prevent or reduce lateral movement or oscillation 4 of the inflatable airbag cushion 140 relative to the seat 22. Furthermore, the upper attachments 150 and the lower attachment 146 of the inflatable airbag cushion 140 may be configured to, in combination, prevent or reduce vertical movement, bobbing, or dipping 6 of the inflatable airbag cushion 140 relative to the seat 22. Preventing or reducing lateral movement or oscillation 4 and/or vertical movement, bobbing, or dipping 6 of the inflatable airbag cushion 140 relative to the seat 22 may advantageously dispose the inflatable airbag cushion 140 to receive the occupant 50 during a collision event. In other words, the upper attachments 150 and the lower attachment 146 of the inflatable airbag cushion 140 may, with predictable reliability and consistency, dispose the inflatable airbag cushion 140 to receive the occupant 50, and provide for ride down, while avoiding a risk of introducing other injury mechanisms, such as directing the occupant against a vehicle structure (e.g., the seatback 24, headrest 26, another seat, another occupant, a doorpost, a window).

FIG. 4A is a detailed side view of a portion of the SRAA 100 as denoted by the callout A in FIG. 2C, with the inflatable airbag cushion 140 in a deployed configuration. The headrest 26 and the void or recessed area 114 of the headrest 26 are shown. The upper portion 120/extension 121 of the housing 118 is shown at least partially disposed within the void or recessed area 114 of the headrest 26. The inflatable airbag cushion 140 is in a deployed configuration and at least partially inflated by inflation gas. The upper attachment 150 (e.g., tether 160) couples an upper portion 142 of the inflatable airbag cushion 140 to the forward panel 124 of the housing 118. More particularly, the tether 160 couples at a forward portion 143a of the upper portion 142 of the inflatable airbag cushion 140, and further couples at the forward panel 124 at the upper portion 120 (or extension 121) of the housing 118. The tether 160 is more fully described in conjunction with FIGS. 5A-6C and 9A.

FIG. 4B is a detailed side view of a portion of the SRAA 100 as denoted by the callout A in FIG. 2C, with the inflatable airbag cushion 140 in a deployed configuration. The headrest 26 and the void or recessed area 114 of the headrest 26 are shown. The upper portion 120/extension 121 of the housing 118 is shown at least partially disposed within the void or recessed area 114 of the headrest 26. The inflatable airbag cushion 140 is in a deployed configuration and at least partially inflated by inflation gas. The upper attachment 150 (e.g. panel 170) couples an upper portion 142 of the inflatable airbag cushion 140 to the forward panel 124 of the housing 118. More particularly, the panel 170 couples at a side portion 143b of the upper portion 142 of the inflatable airbag cushion 140; and further couples at the side panel 125 at the upper portion 120 (or extension 121) of the housing 118. The panel 170 may be formed of any suitable bendable, foldable material, such as, e.g., the same material of which the inflatable airbag cushion 140 is formed. The panel 170 is coupled at a first edge 171 with the side portion 143b of the upper portion 142 of the inflatable airbag cushion 140. The panel 170 is further coupled at a second edge 172 with side panel 125 of the upper portion 120 or extension 121 of the housing 118. The panel 170 is further described in conjunction with FIG. 9B.

FIG. 4C is a detailed side view of a portion of the SRAA 100 as denoted by the callout A in FIG. 2C, with the inflatable airbag cushion 140 in a deployed configuration. The headrest 26 and the void or recessed area 114 of the headrest 26 are shown. The upper portion 120/extension 121 of the housing 118 is shown at least partially disposed within the void or recessed area 114 of the headrest 26. The inflatable airbag cushion 140 is in a deployed configuration and at least partially inflated by inflation gas. The upper attachment 150 (e.g., loop 180) couples an upper portion 142 of the inflatable airbag cushion 140 with the forward panel 124 of the housing 118. More particularly, the loop 180 coupling at a forward portion 143a of the upper portion 142 of the inflatable airbag cushion 140; and further coupling at the forward panel 124 at the upper portion 120 (or extension 121) of the housing 118. The loop 180 is more fully described in conjunction with FIGS. 7A-7C, 8A-8B, and 9C.

The tether 160, the panel 170, and the loop 180, as described above, couple, respectively to the forward portion 143a, the side portion 143b, and the forward portion 143a; however, this is for convenience of the disclosure and not by way of limitation. As noted below, the upper attachment 150, whether the tether 160, the panel 170, or the loop 180, may couple to either the forward portion 143a or the side portion 143b of the upper portion 142 of the inflatable airbag cushion 140. Similarly, the tether 160 and the loop 180 are depicted coupled to the forward panel 124 of the housing 118, and the panel 170 is depicted coupled to the side panel 125 of the housing 118. This, again, is for convenience of the disclosure, and the upper attachment 150, whether the tether 160, the panel 170, or the loop 180, may couple at either the forward panel 124 or the side panel 125 of the housing 118.

Figure 5A:
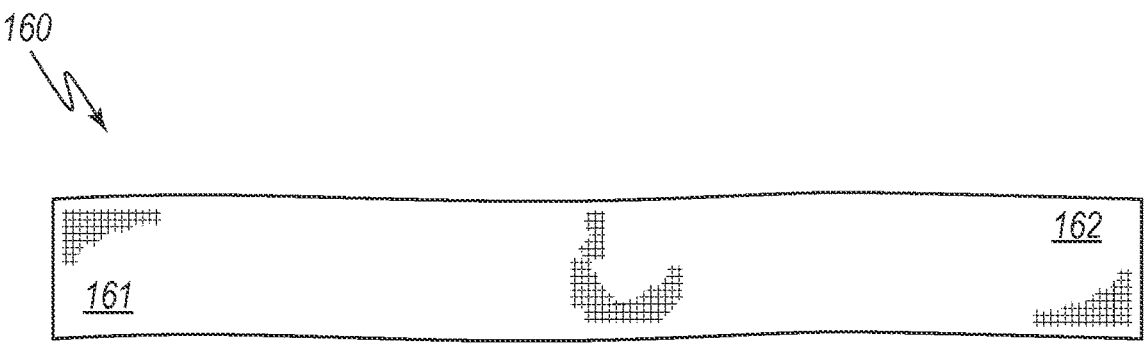
FIG. 5A is a plan view of a tether of a SRAA with the tether shown prior to assembly to the SRAA, according to one embodiment of the present disclosure.

FIG. 5A is a plan view of the tether 160 according to one embodiment of the present disclosure. The tether 160 comprises a first end 161 and a second end 162, the first and second ends 161, 162 being disposed distal to each other.

Figure 5B:
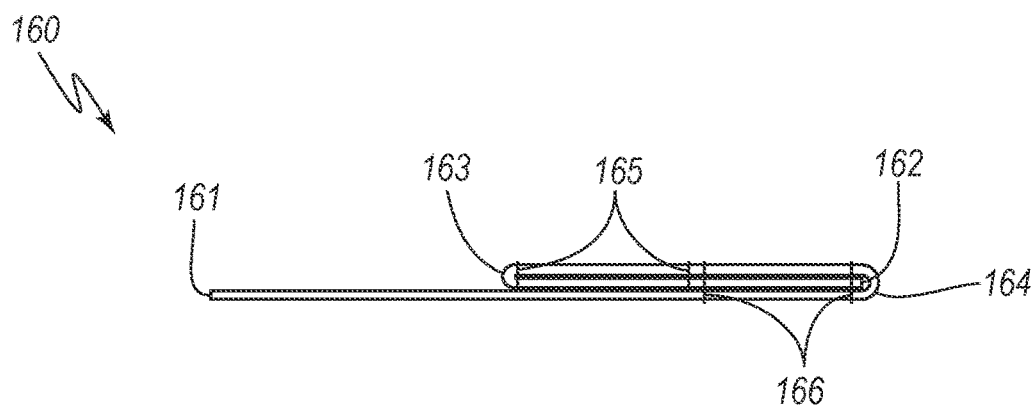
FIG. 5B is a side view of the tether of the SRAA of FIG. 5A, the tether at a later stage prior to assembly to the SRAA.

FIG. 5B is a side view of the tether 160 at a later stage prior to assembly to the SRAA 100, according to an embodiment of the present disclosure. The second end 162 has been folded back on itself at a first fold 163, and coupled by a first stitching 165 (or another mechanism). The second end 162 has been folded back on itself at a second fold 164, and coupled by a second stitching 166 (or another mechanism). The first stitching coupling two layers of the tether 160 together and the second stitching coupling three layers of the tether 160 together.

Figure 5C:
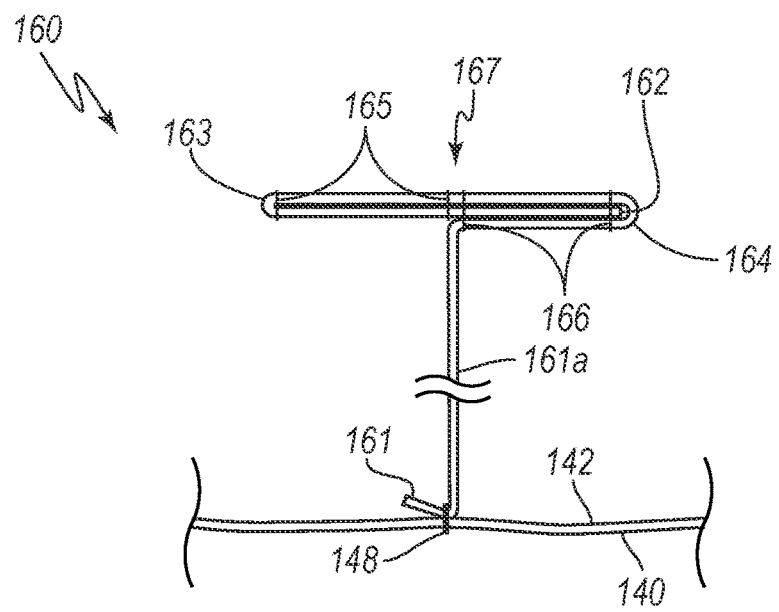
FIG. 5C is a side view of the tether of the SRAA of FIG. 5A, the tether fully formed prior to assembly to the SRAA.

FIG. 5C is a side view of the tether 160 with the tether 160 fully formed prior to assembly to the SRAA 100. The tether 160 has been folded such that the first end 161 extends generally perpendicularly from a T-shape 167 formed by folding and coupling of the second end 162. The first end 161 is coupled (as by stitching, etc.) 148 at the upper portion 142 of the inflatable airbag cushion 140. Between the first end 161 and the T-shape 167 near the second end 162 is a standing portion 161a of the tether 160.

Figure 6C:
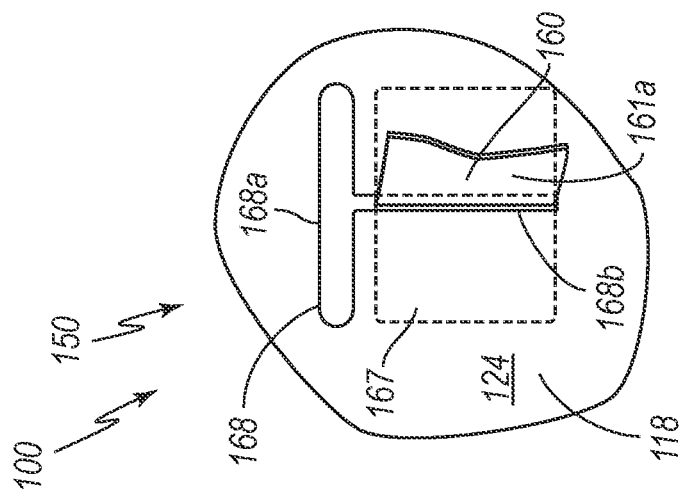
FIG. 6C is a detailed front view of a portion of the housing and the tether of the SRAA of FIG. 6A, with the upper attachment assembled to the housing.
Figure 6B:
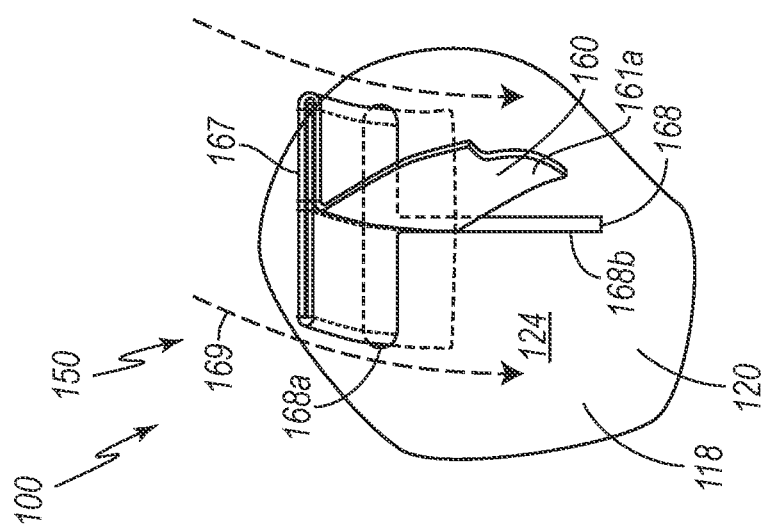
FIG. 6B is a detailed front view of a portion of the housing and the tether of the SRAA of FIG. 6A, during assembly of the tether to the housing.
Figure 6A:
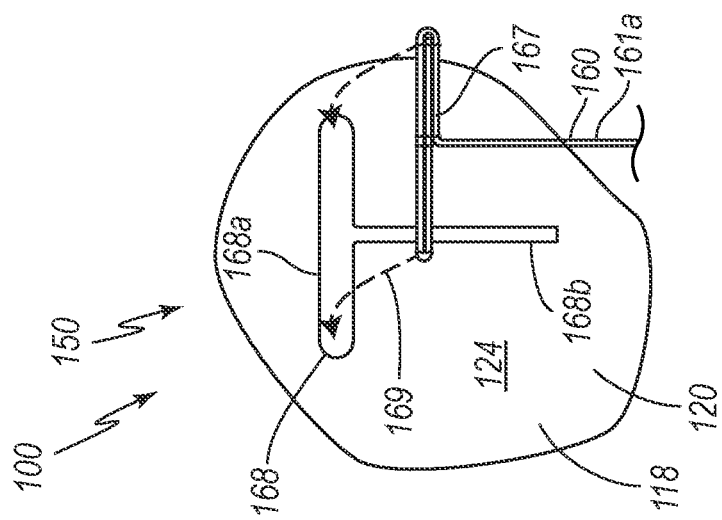
FIG. 6A is a detailed front view of a portion of a housing and a tether of a SRAA, prior to assembly of the tether to the housing, according to one embodiment of the present disclosure.

FIG. 6A is a detailed front view of a portion of the housing 118 and the tether 160 of the SRAA 100 prior to assembly of the tether 160 to the housing 118. The T-shape 167 of the tether 160 is configured to slide into a slot 168 disposed in the upper portion 120 of the housing 118. The slot 168 is disposed in the front panel 124 of the housing 118. The slot 168 comprises a T-shape having an upper portion 168a and a lower portion 168b, wherein the lower portion 168b extends generally perpendicularly from the upper portion 168a. The T-shape 167 of the tether 160 is configured to slide into the upper portion 168a of the slot 168. Concordantly, the upper portion 168a of the slot 168 is configured to receive the T-shape 167 of the tether 160. The standing portion 161a of the tether 160 is shown for reference.

FIG. 6B is a detailed front view of a portion of the housing 118 and the tether 160 of the SRAA 100 during assembly of the tether 160 to the housing 118. The upper and lower portions 168a, 168b of the slot 168 are identified for reference. The slot 168 is disposed in the front panel 124 and at the upper portion 120 of the housing 118. The tether 160 is shown partially inserted into the upper portion 168a of the slot 168. More particularly, the T-shape 167 of the tether 160 is partially inserted through the upper portion 168a of the slot 168. The T-shape 167 of the tether 160 is configured to slide 169 through the upper portion 168a of the slot 168. To slide 169 the T-shape 167 into the upper portion 168a of the slot 168, the T-shape 167 is articulated downward such that the T-shape 167 begins to be disposed forward of the forward panel 124 and the standing portion 161a of the tether 160 begins to extend rearward through the lower portion 168b of the slot 168. In other words, the slot 168 is configured to receive the tether 160, by sliding 169 the tether 160 into and coupling with the slot 168 wherein a top portion of the T-shape 167 of the second end 162 is disposed outside the housing 118.

FIG. 6C is a detailed front view of a portion of the housing 118 and the tether 160 of the SRAA 100 with the upper attachment 150 assembled to the housing 118. The tether 160 is disposed at and coupled to the slot 168. The T-shape 167 of the tether 160 has been passed through the upper portion 168a of the slot 168 and is disposed forward of the forward panel 124 and outside the housing 118, with the standing portion 161a of the tether 160 extending through the lower portion 168b of the slot 168 and into the housing 118 whereby the first end is coupled to the forward portion of the inflatable airbag cushion (see the first end 161, the upper portion 142, and the inflatable airbag cushion 140 in FIG. 5C). Said otherwise, the tether 160 comprises a first end 161 coupled to an upper portion 142 of the inflatable airbag cushion 140 and a second end 162 that is coupled to the upper portion 120 of the housing 118.

Figure 7A:
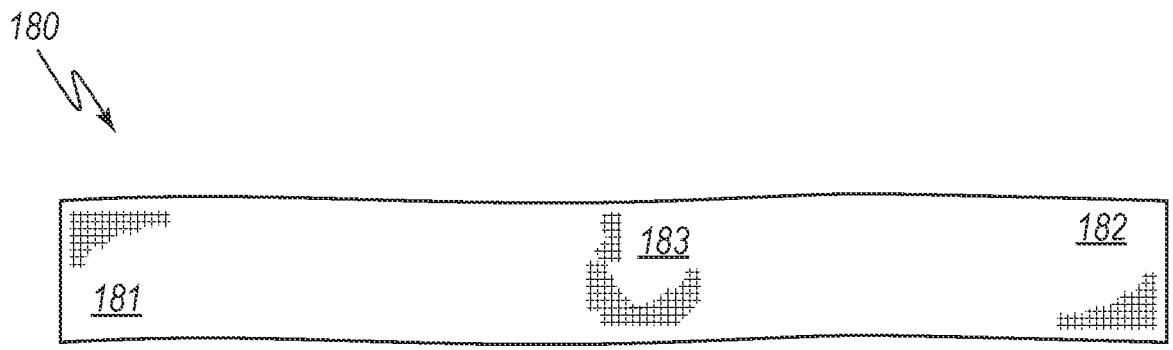
FIG. 7A is a plan view of a loop of a SRAA, the loop shown prior to assembly to the SRAA, according to one embodiment of the present disclosure.

FIG. 7A is a plan view of the loop 180 prior to assembly to the SRAA 100, according to an embodiment of the present disclosure. The loop 180 comprises a first end 181 and a second end 182, the first and second ends 181, 182 being disposed distal to each other, with a standing portion 183 of the loop 180 disposed between them.

Figure 7B:
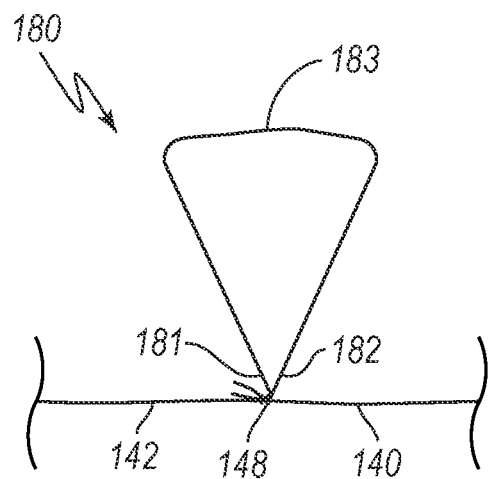
FIG. 7B is a side view of the loop of the SRAA of FIG. 7A, during assembly of the loop.

FIG. 7B is a side view of the loop 180 of the SRAA 100 with the loop 180 at a later stage during assembly to the SRAA 100, according to an embodiment of the present disclosure. The first end 181 of the loop 180 is coupled (e.g., stitched) 148 to the upper portion 142 of the inflatable airbag cushion 140. The second end 182 of the loop 180 is also coupled (e.g., stitched) 148 to the upper portion 142 of the inflatable airbag cushion 140. In one embodiment, the first and second ends 181, 182 of the loop 180 may be coupled together then jointly coupled to the upper portion 142 of the inflatable airbag cushion 140.

Figure 7C:
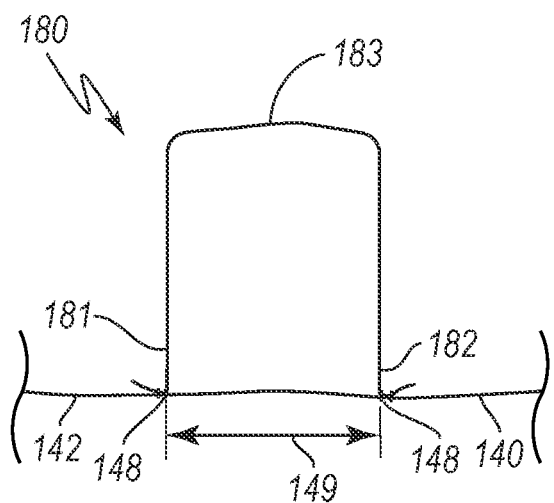
FIG. 7C is a side view of a variation of the loop of the SRAA of FIG. 7B, during assembly of the loop.

FIG. 7C is a side view of a variation of the loop 180 with the loop 180 at a later stage during assembly to the SRAA 100, according to an embodiment of the present disclosure. The standing portion 183 of the loop 180 is shown for reference. In the variation of FIG. 7C, the first end 181 and the second end 182 are separately coupled (e.g., stitched) 148 to the upper portion 142 of the inflatable airbag cushion 140 such the first and second ends 181, 182 are coupled a lateral distance 149 away from each other at the upper portion 142 of the inflatable airbag cushion 140.

Figure 8A:
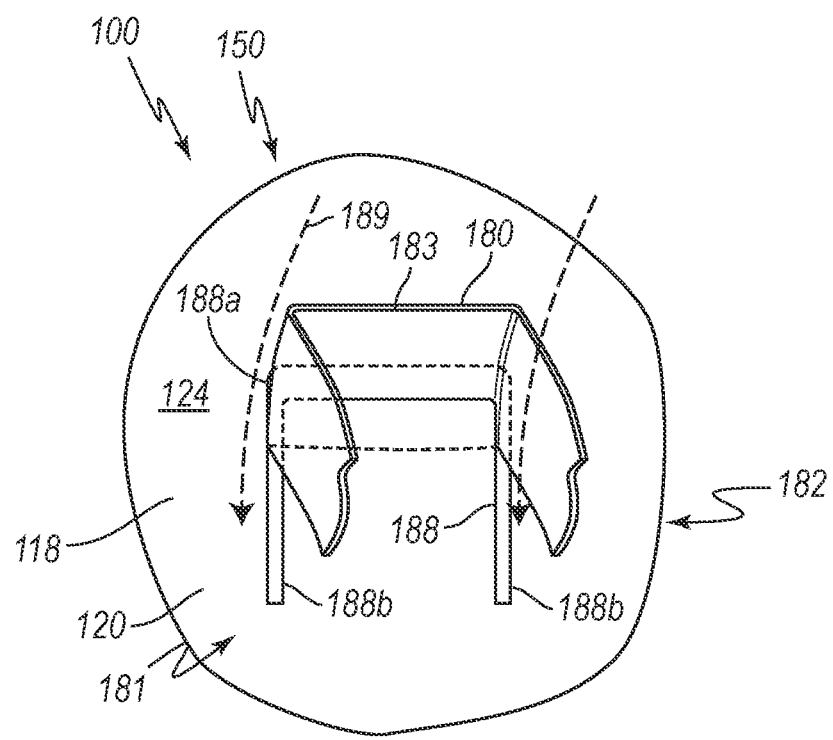
FIG. 8A is a front view of a portion of a housing and a loop of a SRAA, during assembly of the upper attachment to the housing, according to one embodiment of the present disclosure.

FIG. 8A is front view of a portion of the housing 118 and the loop 180 of the SRAA 100 during assembly of the loop 180 to the housing 118. In the illustrated embodiment of FIG. 8A, a slot 188 having a general shape of an inverted U is disposed in the forward panel 124 and within the upper portion 120 of the housing 118. The slot 188 comprises an upper portion 188a and two lower portions 188b, the lower portions 188b extending generally perpendicularly to the upper portion 188a of the slot 188. The standing portion 183 of the loop 180 may couple to the slot 188 by sliding 189 through the upper portion 188a of the slot whereby the first and second ends 181, 182 extend through respective lower portions 188b of the slot 188.

Figure 8B:
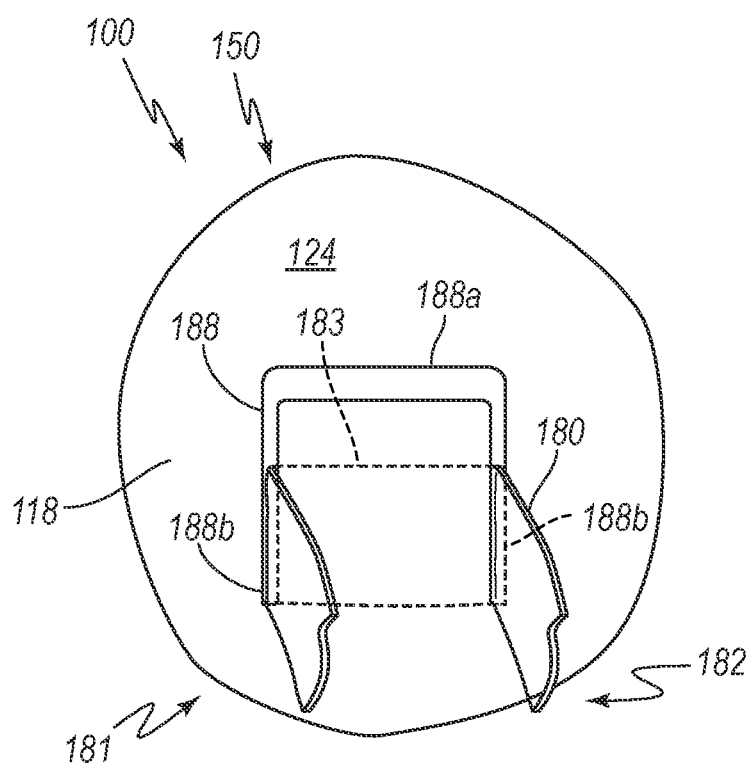
FIG. 8B is a front view of the portion of the housing and the loop of the SRAA of FIG. 8A, following assembly of the upper attachment to the housing.

FIG. 8B is front view of a portion of the housing 118 and the loop 180 of the SRAA 100 following assembly of the upper attachment 150 to the housing 118. The upper and lower portions 188a, 188b of the slot 188 are identified for reference. The standing portion 183 of the loop 180 has been disposed through the upper portion 188a of the slot 188 so as to be disposed outside the housing 118, and the first and second ends 181, 182 of the loop 180 extend through the lower portions 188b of the slot 188 into the housing 118 and are coupled to the upper portion of the inflatable housing (the upper portion 142 and the inflatable airbag cushion 140 in FIGS. 4B, 7B, and 7C).

Figure 9A:
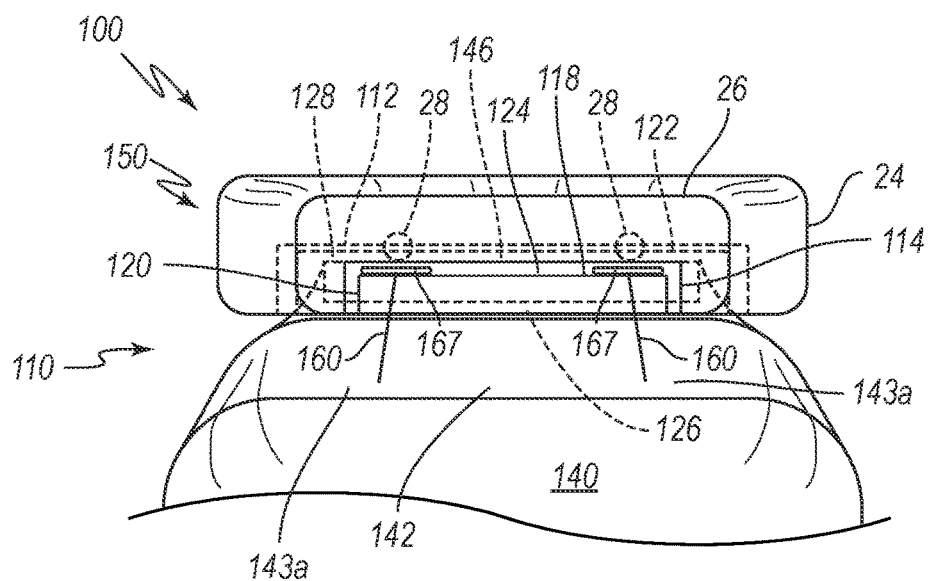
FIG. 9A is a partial, generally downward view of an inflatable airbag assembly of a SRAA, according to one embodiment of the present disclosure.

FIG. 9A is a partial, generally downward view of the inflatable airbag module 110 of the SRAA 100. The view angle of FIG. 9A is indicated by the section line B of FIG. 2C. The seatback 24 and the headrest 26 are identified for reference. The lower portion 122 of the housing 118 is disposed at least partially within the void or space 112 within the seatback 24. The upper portion 120 of the housing 118 is at least partially disposed within the void or recessed area 114 of the headrest 26. Support members 28 for the headrest 26 are disposed forward of the housing 118. The inflator 128 is disposed at least partially within the housing 118, and at least partially within the inflatable airbag cushion 140. The inflator 128 is disposed at or near the lower panel 126 of the housing 118. The inflatable airbag cushion 140 is in a deployed configuration and at least partially inflated by inflation gas from the inflator 128. The lower attachment 146 of the inflatable airbag cushion 140 couples to the lower portion 122 of the housing 118. In one embodiment, the lower attachment 146 may couple at the lower panel 126 of the housing 118. In one embodiment, the lower attachment 146 may couple at the inflator 128 whereby the lower attachment 146 is coupled to the lower portion 122 of the housing at the lower panel 126, or at a lower portion of the forward panel 124, or both.

In the embodiment of FIG. 9A, the upper attachment 150 comprises a plurality of tethers 160 that couple the inflatable airbag cushion 140 to the upper portion of the housing 118. More particularly, two tethers 160 couple at distinct locations of the forward portion 143a of the upper portion 142 of the inflatable airbag cushion 140. In another embodiment, the plurality of tethers 160 may comprise more than two tethers 160. Each tether 160 is configured with a T-shape 167, and each T-shape 167 is disposed through and coupled to a slot (see the slot 168 in FIGS. 6A-6C) whereby the T-shape 167 is outside the housing 118. In one embodiment, one or more tethers 160 may couple to the upper portion 142 of the inflatable airbag cushion 140 at a side portion (see the side portion 143b in FIGS. 4B and 9B) of the inflatable airbag cushion 140.

Figure 9B:
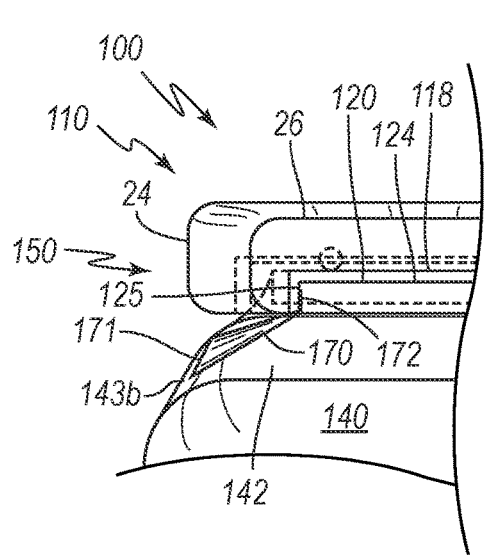
FIG. 9B is a partial, generally downward view of the inflatable airbag assembly of the SRAA of FIG. 9A.

FIG. 9B is a partial, generally downward view of the inflatable airbag module 110 of the SRAA 100. The view angle of FIG. 9B is indicated by the section line B of FIG. 2C. The seatback 24, the headrest 26, and the upper portion 120 of the housing 118 are identified for reference. In the embodiment of FIG. 9B, the upper attachment 150 comprises a panel 170. The first edge 171 of the panel 170 is coupled to a side portion 143b of the upper portion 142 of the inflatable airbag cushion 140, and the second edge 172 is coupled to the side panel 125 at the upper portion 120 of the housing 118. In one embodiment, the second end 172 of the panel 170 may be formed into a T-shape similar to the T-shape of the tether (see the T-shape 167 of the tether 160 in FIGS. 5C-6C and 9A). Furthermore, the side panel 125 may be configured with a T-shape slot similar to the slot (see the slot 168 in FIGS. 6A-6C) employed with the tether 160. In one embodiment, the slot similar to the slot 168 may be disposed at the forward panel 124. The T-shape similar to the T-shape 167 may be disposed through a slot that is similar to the slot 168 such that the T-shape is disposed outside the housing 118.

FIG. 9B illustrates one panel 170 disposed to one side of the housing 118 and the inflatable airbag cushion 140; however, this is for convenience of the disclosure. A second panel 170 may be similarly disposed at an opposite side of the housing 118 and the inflatable airbag cushion 140. In one embodiment, the upper attachment 150 may comprise a plurality of panels 170.

Figure 9C:
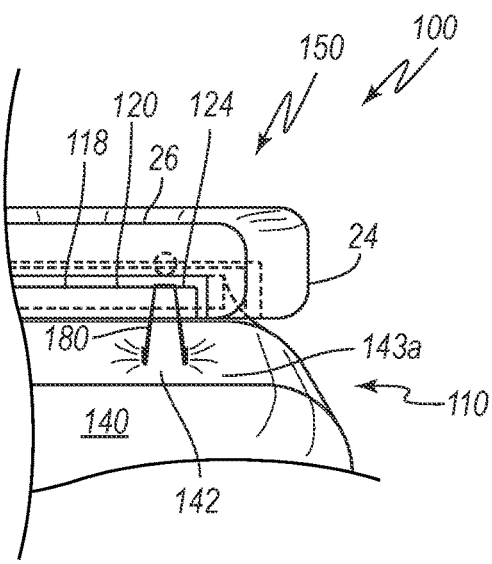
FIG. 9C is a partial, generally downward view of the inflatable airbag assembly of the SRAA of FIG. 9A.

FIG. 9C is a partial, generally downward view of the inflatable airbag module 110 of the SRAA 100. The seatback 24, the headrest 26, and the upper portion 120 of the housing 118 are identified for reference. In the embodiment of FIG.

9C, the upper attachment 150 comprises a loop 180. The loop 180 couples the forward portion 143a of the upper portion 142 of the inflatable airbag cushion 140 to the forward panel 124 at an upper portion 120 of the housing 118. While FIG. 9C depicts one loop 180 disposed toward one side of the housing 118 and the inflatable airbag cushion 140; this is for convenience of the disclosure and not by way of limitation. The disclosure anticipates that the embodiment of FIG. 9C comprises a second loop 180 similarly disposed toward the opposite side of the housing 118 and the inflatable airbag cushion 140. In one embodiment, there may be more than two loops 180. In one embodiment, the upper attachment 150 comprises a plurality of loops 180 that couple to an upper portion 142 of the inflatable airbag cushion 140 and the upper portion 120 of the housing 118.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. Embodiments of the disclosure in which an exclusive property or privilege is claimed are defined as follows.

The invention claimed is:

1. An airbag assembly comprising:
 a housing comprising a lower portion disposed within a seatback of a seat of a vehicle and an upper portion including an extension that extends out of the seat;
 an inflator to supply inflation gas, the inflator at least partially disposed within the housing; and
 an inflatable airbag cushion disposed within the housing to receive inflation gas from the inflator and configured to deploy from the housing to a deployed configuration,
 wherein the inflatable airbag cushion comprises a lower attachment that couples at the lower portion of the housing and an upper attachment that couples at the upper portion of the housing.

2. The airbag assembly of claim 1, wherein the upper portion of the housing has a reduced depth compared to a depth of the lower portion of the housing.

3. The airbag assembly of claim 1, wherein the inflator is fixed to the lower portion of the housing.

4. The airbag assembly of claim 3, wherein the lower attachment of the inflatable airbag cushion is attached to the inflator.

5. The airbag assembly of claim 1, wherein the upper attachment comprises a tether that couples the inflatable airbag cushion to the upper portion of the housing.

6. The airbag assembly of claim 5, wherein the upper attachment comprises a plurality of tethers that couple the inflatable airbag cushion to the upper portion of the housing.

7. The airbag assembly of claim 5, wherein the tether comprises a first end coupled to an upper portion of the inflatable airbag cushion and a second end that is coupled to the upper portion of the housing.

8. The airbag assembly of claim 7, wherein the second end of the tether comprises a T-shape that is configured to slide into a slot disposed in the upper portion of the housing.

9. The airbag assembly of claim 1, wherein the upper attachment comprises a plurality of loops that couple to an upper portion of the inflatable airbag cushion and the upper portion of the housing.

10. The airbag assembly of claim 1, wherein the housing comprises a slot disposed in the upper portion of the housing.

11. The airbag assembly of claim 10, wherein the slot comprises a T-shape and is configured to receive the upper attachment, wherein the upper attachment comprises a tether with a first end that couples to an upper portion of the inflatable airbag cushion and a second end that slides into and couples to the slot.

12. The airbag assembly of claim 1, wherein a rear-facing portion of the housing is open and the inflatable airbag assembly is disposed within a cover with a burst seam that is configured to break apart upon deployment of the inflatable airbag cushion.

13. An inflatable airbag assembly comprising:
 a housing to be at least partially mounted within a seatback of a seat;
 an inflator to supply inflation gas at least partially disposed within the housing; and
 an inflatable airbag cushion disposed in an undeployed configuration within the housing to receive inflation gas from the inflator and configured to deploy from the housing to a deployed configuration,
 wherein the housing further comprises an extension that extends out of the seat and into a recessed area of a headrest of the seat.

14. The airbag assembly of claim 13, wherein the inflatable airbag cushion comprises a lower attachment that couples to a lower portion of the housing and an upper attachment that couples to an upper portion of the extension of the housing.

15. The airbag assembly of claim 14, wherein the upper attachment comprises a tether that couples the inflatable airbag cushion to the upper portion of the extension of the housing.

16. The airbag assembly of claim 15, wherein the housing comprises a slot disposed in the upper portion of the housing.

17. The airbag assembly of claim 16, wherein the slot comprises a T-shape.

18. The airbag assembly of claim 17, wherein the slot is configured to receive the upper attachment, wherein the upper attachment comprises a tether with a first end that couples an upper portion of the inflatable airbag cushion and a second end with a T-shape that slides into and couples to the slot, wherein a top edge of the T-shape of the second end is disposed outside the housing.

19. The airbag assembly of claim 13, wherein a cover of the seatback comprises a burst seam that is configured to break apart upon deployment of the inflatable airbag cushion.

\* \* \* \* \*